Nov. 23, 1948.  A. E. BAAK  2,454,423
SAFETY SWITCH FOR AIRPLANES
Filed Dec. 2, 1942  5 Sheets-Sheet 1
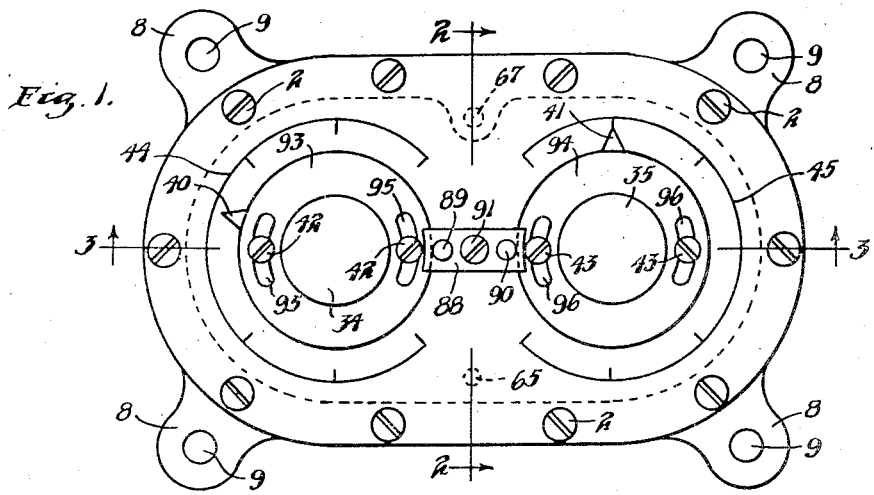
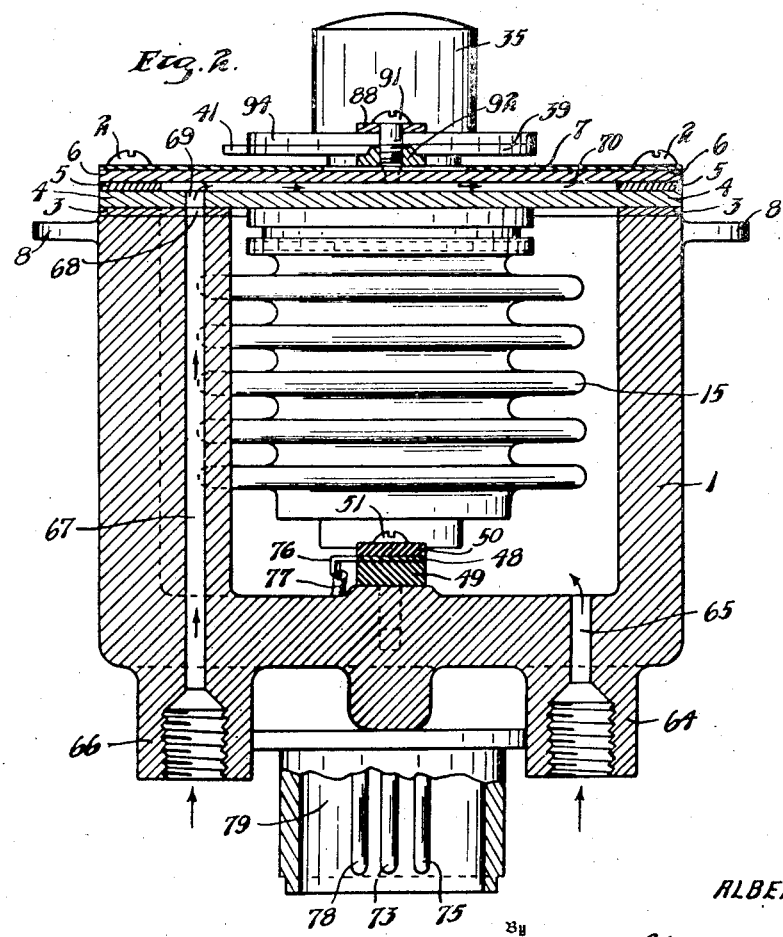
Inventor
ALBERT E. BAAK.
George N. Fisher
Attorney

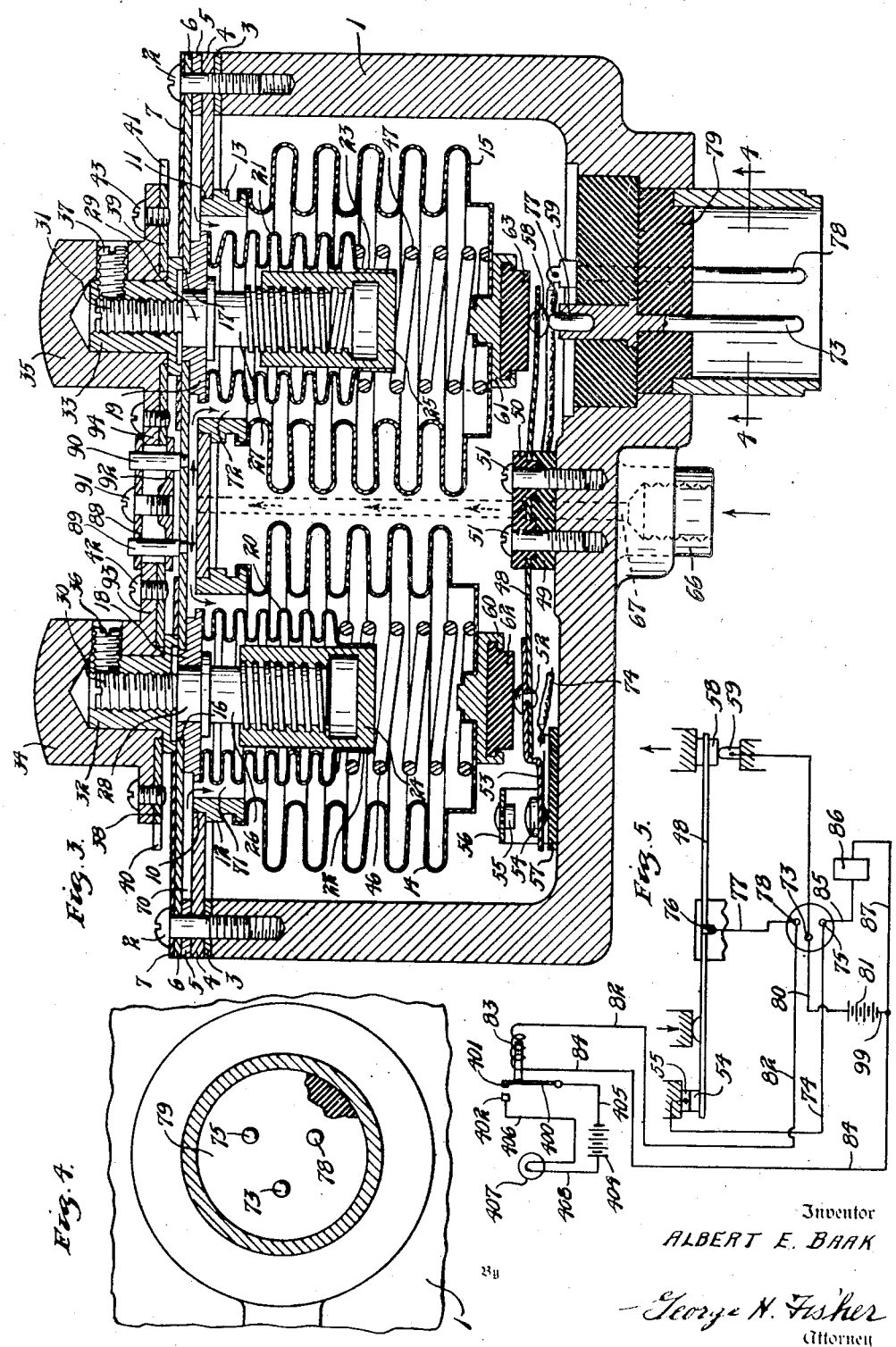

Nov. 23, 1948.   A. E. BAAK   2,454,423
SAFETY SWITCH FOR AIRPLANES
Filed Dec. 2, 1942   5 Sheets-Sheet 3
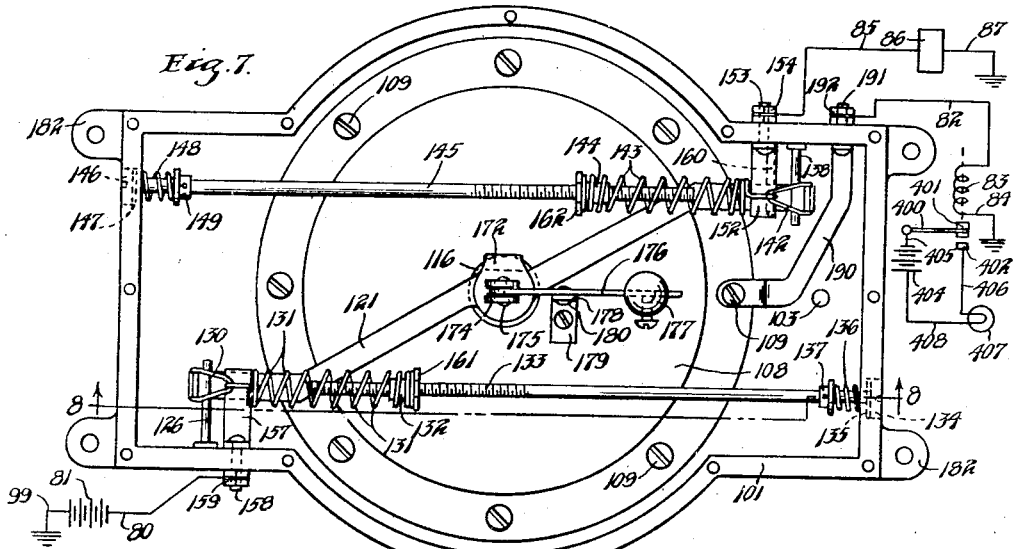
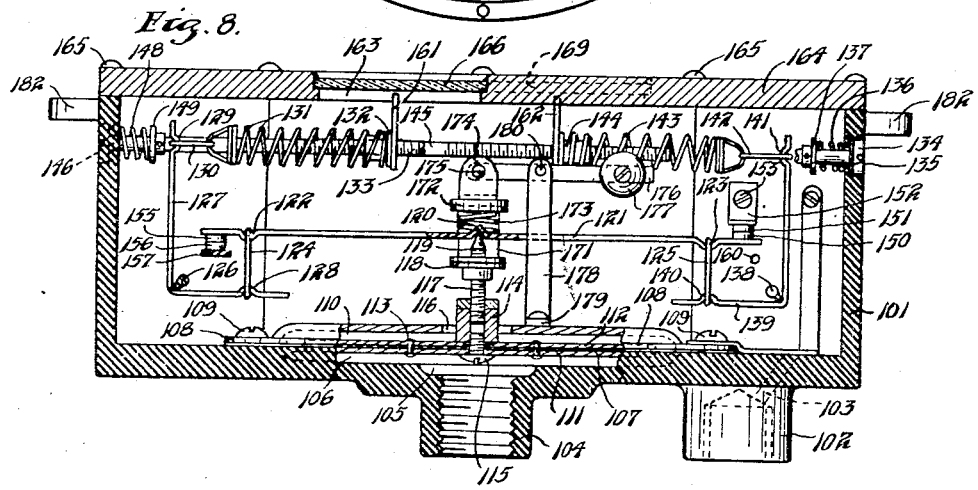
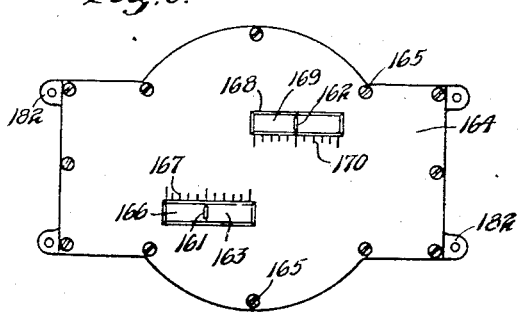
Inventor
ALBERT E. BAAK
By
George N. Fisher
Attorney Nov. 23, 1948.　　　　　A. E. BAAK　　　　　2,454,423
SAFETY SWITCH FOR AIRPLANES
Filed Dec. 2, 1942　　　　　　　　　　　　　　5 Sheets-Sheet 4
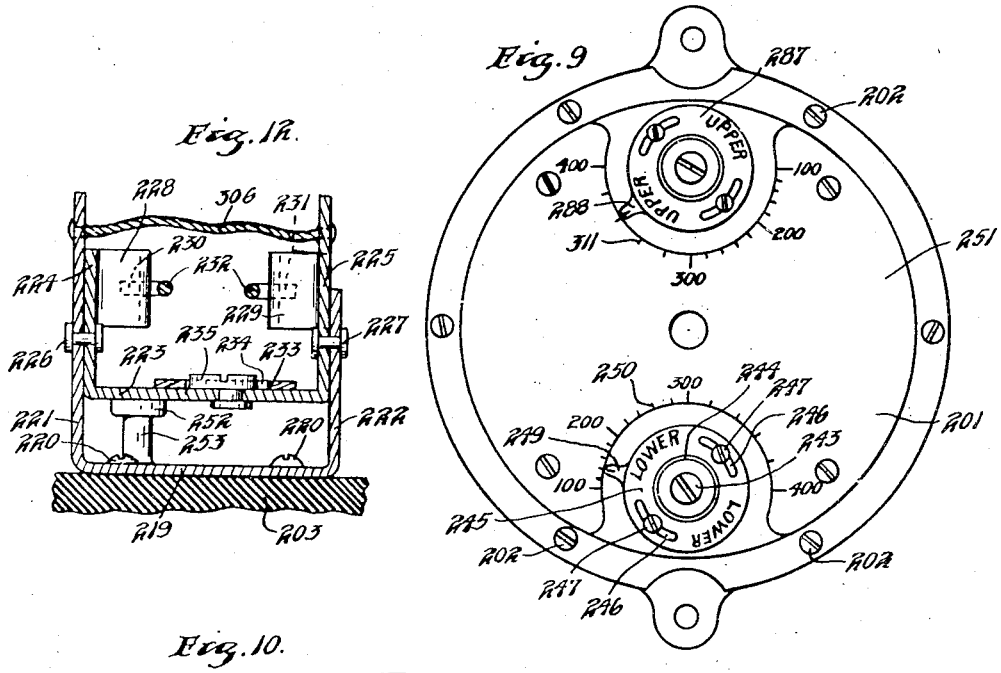
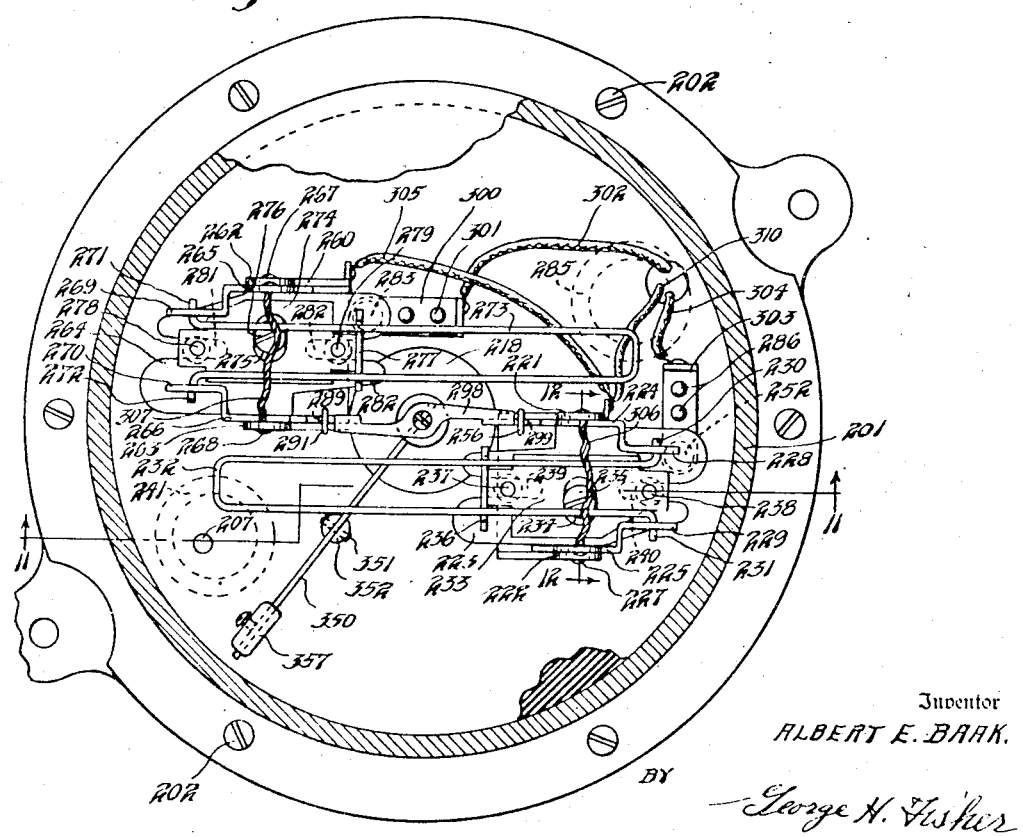
Inventor
ALBERT E. BAAK,
BY George H. Fisher
Attorney Nov. 23, 1948.  A. E. BAAK  2,454,423
SAFETY SWITCH FOR AIRPLANES
Filed Dec. 2, 1942  5 Sheets-Sheet 5
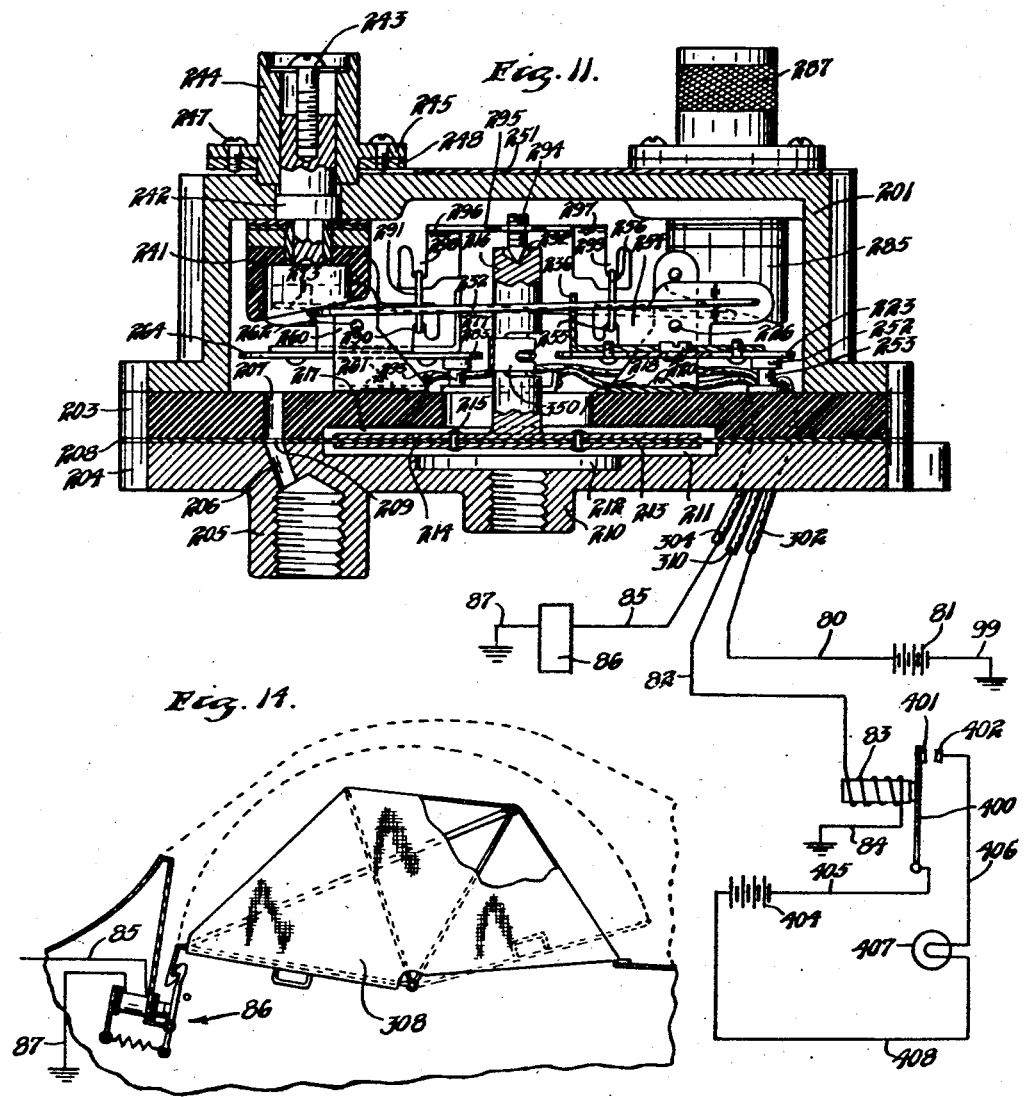
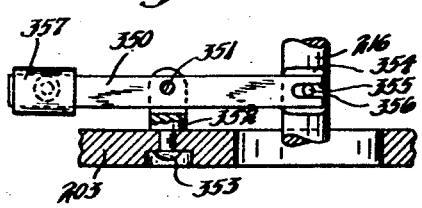
Inventor
ALBERT E. BAAK.
By
George N. Fisher
Attorney Patented Nov. 23, 1948

2,454,423

UNITED STATES PATENT OFFICE 2,454,423

SAFETY SWITCH FOR AIRPLANES

Albert E. Baak, Los Angeles, Calif., assignor to Minneapolis-Honeywell Regulator Company, Minneapolis, Minn., a corporation of Delaware Application December 2, 1942, Serial No. 467,597

24 Claims. (Cl. 200—81.5)

My invention relates to aircraft instruments, and more particularly to an instrument for indicating unsafe flight conditions of the plane.

During the training of aircraft pilots in blind flying, it is customary to provide a hood-like cover which comes down over the cockpit of the plane so as to close off the vision of the pilot, simulating thereby actual flying conditions which the pilot may encounter and requiring the pilot to maneuver entirely during such flight by the aircraft indicating instruments.

During such practice maneuvering in blind flying, an inexperienced pilot may well go into a stall or dive without his detection of such condition until too late to prevent destruction of the plane and occupants, unless some means is provided for forcibly warning the pilot of the impending danger.

Further during such practice flight, it is quite possible for a pilot, if reckless or inexperienced, to literally fly the wings off the plane upon excessive speed by increasing the load on the wings beyond a safe range and causing the wings under extreme force to be actually torn from the plane.

It is an object of my invention, therefore, to provide an air speed switch adapted particularly for use as a safety control for breaking upon such impending danger the circuit of a flying hood control. The flying hood control circuit may be of a type such as disclosed in the co-pending application of Willis H. Gille, Serial No. 460,522, filed October 2, 1942, now Patent No. 2,420,946, granted May 20, 1947.

Another object of my invention is to provide a switch adapted to cause actuation of any suitable type of signal device upon the aerodynamic conditions of the plane approaching a predetermined unsafe condition.

Another object of my invention is to provide a novel control switch whereby an aircraft pilot may be warned upon the plane exceeding a predetermined safe maximum speed and upon the speed of the plane decreasing below a predetermined safe minimum speed.

Another object is to provide a single aircraft speed responsive device for actuating two switches, and separate means for independently manually adjusting a measured force which the aircraft speed responsive device must offset to actuate each switch.

Another object of my invention is to make these adjustments simple and readily accessible and to provide scales wherein each limit of air speed may be separately read.

A further object is to provide in an aircraft instrument, a floating lever which is operatively engaged at a mid point by an aircraft speed responsive device and to oppose movement of the lever by adjustable spring means connected to opposite ends of the lever and to provide electrical contacts positioned at opposite ends of the lever in such a manner as to break a circuit upon a variance in the force applied by the aircraft speed responsive device above a predetermined maximum force or below a predetermined minimum force.

Another object is to provide adjustable means for varying the spring rate of the aforesaid spring means for the more accurate calibration of the instrument to the air speeds desired.

A further object is to provide in combination with an aerodynamic pressure responsive switch means, an acceleration responsive means, arranged so that upon changes in the velocity of the plane the forces developed through the inertia of the parts of the switch mechanism will be balanced so as to eliminate the accidental opening or closing of the switch means which might otherwise result from the inertia thereof.

Other objects and advantages of this invention are set forth in the following description, taken with the accompanying drawing, and the novel features thereof are pointed out in the appended claims. The disclosure, however, is illustrative only and I may make changes in details, especially in matters of shape, size and arrangement of parts within the principles of the invention, to the full extent indicated by the broad, general meaning of the terms in which the appended claims are expressed.

In the accompanying drawing wherein like reference characters indicate corresponding parts of the various figures, Figure 1 is a plan view of one embodiment of my invention;

Figure 2 is an enlarged sectional view of Figure 1 taken along the line 2—2 and looking in the direction of the arrows;

Figure 3 is an enlarged sectional view of Figure 1 taken along the line 3—3 and looking in the direction of the arrows;

Figure 4 is a fragmentary sectional view taken along the line 4—4 of Figure 3;

Figure 5 is a diagrammatic view illustrating the manner in which the switch mechanism of Figure 1 may be connected into a control circuit;

Figure 6 is a plan view of a second form of my invention;

Figure 7 is an enlarged plan view of Figure 6 with the top removed and illustrating diagrammatically the manner in which the switch mechanism may be connected into a control circuit;

Figure 8 is a sectional view of Figure 7, with the cover in place, taken along the line 8—8 looking in the direction of the arrows and with a portion of the spring adjustment stem broken away;

Figure 9 is a top plan view of a third form of my invention;

Figure 10 is an enlarged plan view of Figure 9 with the cover broken away and showing the relative position of the annular spring adjustment cams in dotted lines;

Figure 11 is a sectional view of Figure 10 with the cover in place taken along the line 11—11 looking in the direction of the arrows and illustrating diagrammatically a circuit controlled by my switch mechanism;

Figure 12 is an enlarged sectional view of the switch supporting bracket arms taken along the line 12—12 of Figure 10 and looking in the direction of the arrows;

Figure 13 is an enlarged detailed fragmentary view showing the connection between the floating switch actuating lever and the counter balancing device; and Figure 14 is a partly diagrammatic illustration of a flying hood control such as may be controlled by my air speed switch.

Having now particular reference to the first form of my invention illustrated in Figure 1, there is shown in Figure 2 and indicated generally by the numeral 1, a casing or housing in which is positioned the operating mechanism. As shown in Figure 2, there is affixed to an open end of the casing 1 by attachment screws 2, a gasket 3, an attachment plate 4, a second gasket 5, a sealing plate 6, and a scale plate 7. The purpose of these structures will appear in more detail hereinafter. Projecting from the casing 1 are the ears or flanges 8, by means of which the instrument may be attached to the aircraft instrument board by suitable screws disposed in apertures 9 formed in the ears 8 as shown in Figure 1.

Provided in the supporting plate 4 as shown in Figure 3 are circular openings 10 and 11 in which are provided annular collars 12 and 13. Affixed to the annular collars 12 and 13 are the actuating or control bellows 14 and 15, respectively. The collars 12 and 13 are sealed to the supporting plate 4 in any suitable manner and thereby effectively seal the interior of the actuating bellows 14 and 15, respectively, from the interior portion of the casing 1.

There are further provided in the top plate 6 circular openings 16 and 17 concentric with the openings 10 and 11, respectively. Disposed respectively in the openings 16 and 17 in sealing relation are plate members 18 and 19 affixed in sealing relation to the top plate 6. Attached to the plates 18 and 19 are the sealing bellows 20 and 21, respectively. The said bellows 20 and 21 are disposed concentrically in spaced relation within the actuating bellows 14 and 15, respectively, as shown in Figure 3. Formed at the lower end of the sealing bellows 20 and 21 are the downwardly projecting annular flange portions 22 and 23, respectively. Slidably disposed within the sealing bellows 20 and 21 and fastened thereto at the flanges 22 and 23, are the partly perforated internally threaded block or nut like portions 24 and 25, respectively. Screw-threadedly engaged in the block or nut like portions 24 and 25, are the shafts or actuating screws 26 and 27, respectively. By turning the screws 26 and 27 the block portions 24 and 25 screw-threadedly engaged thereon may be adjusted up or down, thereby adjusting the movement of the sealing bellows 20 and 21, respectively, for a purpose which will be explained.

The adjustment screws 26 and 27 are journalled at 28 and 29, respectively, in the plates 18 and 19 and project out of the casing 1 in the form of screw shafts 30 and 31. Screw-threadedly engaged on the screw shafts 30 and 31 are bushings 32 and 33, respectively. Mounted on the bushings 32 and 33 are the adjustment knobs 34 and 35 which are fixedly fastened to the bushings engaged on the screw shaft by the fastening or retention screws 36 and 37, respectively. The adjustment knobs 34 and 35 have provided the radially projecting annular flanges 93 and 94 in which are formed a plurality of slots 95 and 96, respectively. Projecting through the slots 95 and 96 and screw-threadedly engaged in plates 38 and 39 are the adjustment screws 42 and 43 for adjustably fastening to the flanges 93 and 94 the plates 38 and 39. The plates 38 and 39 have formed integral therewith the indicator pointers 40 and 41, respectively. For calibration purposes the screws 42 and 43 may be longitudinally adjusted in the slots 95 and 96 so as to conveniently calibrate the pointers 40 and 41 with respect to scale markings 44 and 45 formed in the scale plate 7 as shown in Figure 1.

The indicator pointers 40 and 41 are adapted upon adjustment of the knobs 34 and 35 to cooperate with the scale markings 44 and 45 so as to indicate the airspeed for which such adjustment is made.

Mounted at the free ends of sealing bellows 20 and 21, respectively, are the helical springs 46 and 47 engaging at one end the sealing bellows 20 and 21 and at the opposite end the inner surface of the movable end of bellows 14 and 15, respectively. It will thus be seen that by varying the adjustment of the knobs 34 and 35 the position of screw-threaded blocks 24 and 25 will correspondingly be adjusted and accordingly the compression of the springs 46 and 47. Thus, the compression acting upon the actuating or control bellows 14 and 15 may be readily adjusted.

As shown in Figure 3, there is mounted on the inner surface of the casing 1 adjacent the free ends of the bellows 14 and 15 a resilient spring blade 48. The resilient spring blade 48 is clamped at a point intermediate the opposite ends thereof between two insulation members 49 and 50. The insulation members 49 and 50 are in turn fastened by the bolts 51 to the lower inner surface of the housing 1.

Fastened at one end of the blade 48 by a button or rivet 52 is a downwardly bent arm 53. Mounted at the free end of the arm 53 is a contact 54 adapted to cooperate with a second contact 55 formed on an arm 56. The arm 56 is mounted on the lower inner surface of the casing 1 and is insulated from the casing 1 by an insulation member 57. Mounted on the opposite end of the blade 48 is a contact button 58 adapted to cooperate with a second contact 59.

Mounted at the lower underside of the actuating bellows 14 and 15, are the attachment members 60 and 61 in which are secured insulation members 62 and 63, respectively, as shown in Figure 3. The insulation members 62 and 63 are adapted to bear against the buttons 52 and 58, respectively, previously mentioned, mounted at opposite ends of the spring blade 48. It will be readily seen from Figure 3 that the actuating bellows 14 under compression of the spring 46 will tend to bear down upon the button 52 through the insulation member 62 and thereby tend to open the switch at the contact points 55 and 54. Further, it will be seen that the actuating bellows 15 under compression of spring 47 will tend to bear down through the insulation member 63 upon button 59 and close the switch formed by the contacts 58 and 59.

As shown in Figure 2, the instrument is provided with a connection 64 to which the dynamic pressure line of a standard Pitot tube is connected. The connection 64 leads through a channel 65 into the interior of the casing 1 so that such dynamic pressure will tend to cause the contraction of the bellows 14 and 15. A second connection is provided indicated by the numeral 66 to which the static pressure line of a standard Pitot tube is connected. Such connection leads through a channel 67 drilled in the casing 1, as indicated in Figure 2, through an orifice 68 formed in the gasket 3 and a second orifice 69 formed in the supporting plate 4. The orifice 69 opens in turn into a space 70 formed between supporting plate 4 and the sealing plate 6 which are spaced apart in sealing relation by the gasket 5. The static pressure is conducted through the space 70 directly into the interior of the bellows 14 and 15 through the spaces 71 and 72 provided between the bellows 14 and 15 and the sealing bellows 20 and 21, respectively, as shown in Figure 3. It will thus be seen that the static pressure within the bellows 14 and 15 will tend to augment the expansive force of the helical springs 46 and 47, respectively, and counteract the dynamic force exerting pressure upon the exterior surface of the bellows 14 and 15, as previously explained. Thus, as the difference between the static and the dynamic pressure decreases the bellows 14 will tend to expand causing the contacts 54 and 55 to break upon a differential in pressure below a predetermined value. Further, it will be seen that as the difference in pressure between the static and dynamic pressure increases, the bellows 15 will tend to contract causing the contacts 58 and 59 to break upon a differential in pressure above a predetermined value.

As shown in Figure 3, the contact member 59 is mounted in a pin 73 which forms one terminal for the inlet circuit of the control switch 48. There further is connected to the contact 55 through the arm 56, an electrical conductor 74 which has the opposite end thereof connected to a pin 75 shown in Figures 4 and 5. As shown in Figure 2, the spring blade 48 has a projecting part 76 to which is connected an electrical conductor 77 which has the opposite end thereof connected to a pin 78, as shown in Figures 3 and 5. The pins 73, 75 and 78 are positioned in a suitable socket 79 and the said pins are adapted to engage corresponding contacts of a plug of conventional type, not shown. As shown diagrammatically in Figure 5, the electrical conductor 80 leads to the terminal 73 from a suitable source of electrical energy indicated by numeral 81.

The opposite terminal of the source of electrical energy 81 is connected through a conductor 99 to two conductors 84 and 87 leading respectively to a terminal of separate electrical control devices indicated generally by the numerals 83 and 86. A conductor 82 leads from the terminal 78 to the opposite terminal of the control device 83 which is shown here as an electromagnet. The electromagnet 83 controls a spring switch arm 400 which upon energization of the electromagnet 83 biases the arm 400 so as to open the contacts 401 and 402. But upon deenergization of the electromagnet 83, as upon the opening of the circuit at the contacts 58 and 59, the spring switch arm 400 is biased to an opposite position by the tension of the spring arm 400 closing the contacts 401 and 402. Upon closing the contacts 401 and 402 an electric current flows from a suitable source of energy indicated by numeral 404 through a conduit 405, switch arm 400, contacts 401 and 402, conductor 406, indicator 407 which obviously may be a light, bell, or other indicating device and returns to the source of electric energy through a conductor 408. It will be noted that the indicator 407 will be actuated only upon the opening of contacts 58 and 59 and will not be actuated upon the opening of contacts 54 and 55. Further an electrical conductor 85 leads from the terminal 75 to the other terminal of the electrical control 86 which may operate a flying hood release latch of a type such as described in detail in the copending application of Willis H. Gille, Serial No. 460,522, filed October 2, 1942, and shown herein in Figure 14, or the same may be any other suitable means or indicating device. It will be seen, however, that the indicating device or release magnet of the control device 86 of Figure 14 will be actuated upon the opening of either contacts 54 and 55 or contacts 58 and 59 causing the opening of the flying hood as explained in detail in the aforenoted application of Willis H. Gille.

From the circuits shown in Figure 5, it will be readily seen that in normal operation the switch contacts 58 and 59 will be closed as will the switch contacts 55 and 54, in which case the circuits to devices 83 and 86 will be closed through the switch arm 48. Upon an increase in dynamic pressure above a predetermined point, the bellows 15 will contract causing the contacts 58 and 59 to open under tension of the spring blade 48, thus opening the circuit to both the control devices 83 and 86, in which case should the device 86 control the flying hood release latch as noted, the flying hood will open and further the indicating alarm or device 83 will be actuated. However, upon a decrease in the dynamic pressure below a predetermined point, the bellows 14 will tend to expand, thereby causing the switch contacts 55 and 54 to open against the tension of spring arm 48 and thus open only the circuit to the control device 86, which if the same controls a flying hood such as noted will cause the flying hood to open. It will be seen that under this arrangement the flying hood will be released upon an increase in dynamic pressure above a predetermined point and also upon a decrease in dynamic pressure below a predetermined point, and that furthermore through the indicating device operated by the control device 83 the operator or pilot will be immediately advised as to whether such a release is due to aerodynamic conditions above or below the predetermined limits. Thus the pilot may promptly maneuver the plane so as to overcome such conditions without for example, increasing the speed of the plane, when it should be decreased, or decreasing the speed when it should be increased.

The helical springs 46 and 47 are so calibrated with respect to the instrument that by adjusting the knob 34 and accordingly the indicator pointer 40 upon the scale 44, the lower limits at which the contacts 54 and 55 will break or the minimum air speed at which the contacts 54 and 55 will remain in contact may be readily determined. Thus any speed of the plane below that indicated by the pointer 40 on the scale 44 will cause the control switch 48 to break contact. Similarly, by adjusting the knob 35 the maximum air speed conditions under which the circuit of the control contacts 58 and 59 will remain closed may be conveniently adjusted. The indicator pointer 41 thus will read on the scale 45 the maximum speed limit beyond which the control circuit will be opened and suitable indicating means energized.

In order to lock the adjustment knobs 34 and 35 in adjusted position, I have provided a convenient clamping means including clamping plates indicated by numerals 88 and 92. The clamping plates 88 and 92 are adjustably mounted on pins 89 and 90 which are affixed to the top plate 6 and project through suitable apertures formed in the clamping plates 88 and 92. A bolt 91 is further provided projecting through a suitable aperture in the plate 88 and threadedly engaged in plate 92 so as to adjustably clamp between the same the annular flanges 93 and 94 together with the indicator plates 38 and 39. Thus through adjustment of the bolt 91 the knobs 34 and 35 may be affixed in adjusted position or released for further adjustment.

A second modified form of my invention is illustrated in Figures 6, 7, and 8 wherein I have provided a casing indicated by numeral 101 formed of suitable insulating material. Projecting from the casing 101 are ears 102 whereby the instrument may be positioned in the wing of the plane or in the cabin or instrument board as may be desired. The casing 101 is provided with a connection 102 to which the static pressure line of a standard Pitot tube is connected. As shown in Figure 8, a channel 103 leads from the connection 102 into the interior of the casing 101. A second connection 104 is provided to which the dynamic pressure line of the Pitot tube is connected.

The lower inner wall of the casing 101 has formed therein an annular recess 106 in which there is in turn formed a smaller circular recess 105. The dynamic pressure connection 104 leads into the recess 105. Extending across the recess 106 is a circular diaphragm 107 fastened to the inner surface of the lower wall of the casing 101 by the fastening plate 108 which is in turn fastened by the attachment screws 109. Fastening screws 109 are disposed through suitable apertures formed in the fastening plate 108 and diaphragm 107 and are screw-threadedly engaged in the bottom wall of casing 101. As best shown in Figure 8, the fastening plate 108 has provided therein an annular recess 110 corresponding to the oppositely positioned recess 106 formed in the bottom wall of the casing 101. Mounted on the diaphragm 107 are a pair of concentric circular disks 111 and 112 positioned at opposite sides of the diaphragm 107 and suitably fastened thereto by rivets 113. A post 114 is centrally affixed to the disk 112 by a screw 115 disposed in a suitable central aperture formed in the disk 111, diaphragm 107, and disk 112. The screw 115 projects upwardly through the said disks and diaphragm and screw-threadedly engages the bottom of the post 114 so as to securely fasten post 114 to the disk 112. The post 114 projects upwardly through a suitable aperture formed in the fastening plate 108, as shown in Figures 7 and 8. An adjustable bolt 117 is screw-threadedly engaged in the upper end of the post 114. The adjustable bolt 117 has formed at the upper end thereof a plate 118 on which is mounted a knife-edge bearing 119 which seats in a depression 120 formed in a lever or switch arm 121.

The lever 121 has formed on opposite ends thereof the depressions 122 and 123 in which are disposed respectively links 124 and 125. Supported by the casing 101 is a knife-edge 126 about which a bell-crank lever 127 is adapted to turn. Provided in one end of the bell-crank lever 127 is a depression 128 in which is positioned the lower end of the link 124. In the opposite end of the bell-crank lever 127 is a depression 129. Positioned at one end in the depression 129 is a link 130 which has the opposite end thereof secured to a tension spring 131. Secured to the opposite end of the tension spring 131 is a nut 132 threaded on a stem 133 of a screw 134. The stem of the screw 134 projects through a suitable aperture formed in the casing 101. A gasket or washer 135 surrounds the stem of the screw and is mounted adjacent to the head of the screw 134. A spring 136 surrounds the stem 133 and acts against the inner wall of the casing 101 and a boss 137 secured to the stem 133 so as to hold the head of the screw 134 within an annular depression formed in the outer surface of the casing 101 against the gasket 135 under tension at all times. The gasket 135 is so arranged as to seal the aperture formed in the casing 101 through which the stem of the screw 134 is disposed.

A knife-edge bearing 138 is mounted on the casing 101 so as to support a bell-crank lever 139 which is adapted to rotate about the knife edge 138. A depression 140 is formed at one end of the bell-crank lever 139 and has positioned therein the lower end of the link 125 previously described. The opposite end of the bell-crank lever 139 has formed therein a depression 141 in which is received a link 142. The link 142 has fastened at the other end thereof a tension spring 143. At the opposite end of the tension spring 143 is fastened a nut 144 screw-threadedly engaged on a stem 145 of a screw 146. The stem 145 projects through a suitable aperture formed in the casing wall 101. A gasket or washer 147 surrounds the stem of the screw and is mounted adjacent to the head of the screw 146 which is disposed in an annular depression formed in the outer surface of the casing wall 101. A compression spring 148 surrounds the stem 145 of the screw 146 and is positioned between the inner surface of the casing 101 and a boss 149 which is securely affixed to the stem 145. Thus the spring 148 will hold the screw head 146 and gasket 147 securely against the casing 101 and thereby seal the aperture formed in the casing 101 for the passage of the stem 145 of screw 146.

From the foregoing structure it will be seen that the bell-crank levers 127 and 139 will exert a tension on the opposite ends of the arm 121 which is pivotally mounted in turn at the depression 120 on the knife edge bearing 119.

An electrical contact indicated by the numeral 150 is mounted at one end of the lever 121 and is adapted to cooperate with a second contact 151. The second contact 151 is positioned on a bracket 152 affixed to the side wall of the casing 101 by a screw 153. The screw 153 projects through the wall of the casing 101 through a suitable aperture formed therein and is screw-threadedly engaged at the opposite end by a nut 154. Screw 153 forms one terminal of the switch circuit of the said instrument. A second contact 155 is mounted at the opposite end of the lever 121 and at the other or under side of said lever. The contact 155 is adapted to cooperate with a contact 156 mounted on a bracket 157. The bracket 157 is attached to the opposite wall of the casing 101 from that of the bracket 152 and is attached to the said wall of the casing 101 by a bolt 158 which projects through the wall of the casing 101 and is screw-threadedly engaged at the outer side by nuts 159. The bolt 158 forms the opposite terminal of the switch circuit of the said instrument.

It will be readily seen that the contact 151 formed on the bracket 152 serves as a stop limiting the upward counter-clockwise pivotal movement of the lever 121. Further, the contact 156 mounted on the bracket 157 limits the downward counter-clockwise pivotal movement of the lever 121. A stop 160 is further provided to limit the downward clockwise pivotal movement of that end of the lever 121 at which the contact 150 is mounted.

It will be readily seen that upon an increase in the differential pressure exerted at the diaphragm 107 above the tension exerted by the spring 131 on the lever 121 will cause the contacts 155 and 156 to break. Further, upon a decrease in the differential pressure at the diaphragm 107 below that exerted by the spring 143 upon the lever 121 will result in a break between the contacts 151 and 150 due to the downward pivotal movement of the lever 121 under tension of the spring 143. It will thus be seen that I have provided a novel arrangement whereby upon a predetermined increase or decrease in pressure above or below a predetermined maximum and minimum pressure, a break in the circuit controlled by the switch lever 121 will be readily effected.

As shown in Figures 7 and 8, the screw heads 134 and 146 have been suitably arranged so that the same may be readily adjusted for varying the tension of the springs 131 and 143, respectively. Further, in order that the adjustment of the springs 131 and 143 may be readily ascertained there are mounted on the nuts 132 and 144, respectively, arms 161 and 162. The arm 161 projects upwardly into a slot 163 formed in a top plate 164 fastened to the casing 101 by suitable screws 165. A glass 166 covers the slot 163 formed in the top plate 164 and provides suitable means whereby the position of the arm 161 may be readily ascertained. As shown in Figure 6, scale markings 167 are provided adjacent to the edge of the slot 163 and are adapted to cooperate with the arm 161 so as to indicate the air speed at which the spring 131 is adjusted for the breaking of the circuit controlled by the switch arm 121 and the contacts 155 and 156. It will thus be seen that by turning the head of the screw 134, the tension of the spring 131 may be varied and the adjustment thereof indicated through the arm 161 on the indicating scale 167.

The arm 162 further projects upwardly into a slot 168 formed in the top plate 164, as best shown in Figure 6. A glass 169 covers the slot 168 so that the position of the arm 162 may be readily determined. An indicating scale 170 shown in Figure 6 is mounted adjacent to the edge of the slot 168 and is adapted to cooperate with the arm 162 for indicating the air speed at which the spring 143 is adjusted for causing the opening of the circuit controlled by the arm 121 at the contacts 151 and 150.

As will be readily seen from Figure 8, the dynamic pressure present in the connection 104 will exert a force upon the disk 111 tending to force the post 114 upwardly. However, the static pressure entering through the connection 102 and channel 103 into the interior of the casing 101 will exert a force through the opening 116 upon the disk 112 which will tend to counteract the force exerted upon the disk 111 by the dynamic pressure entering through the connection 104. The static pressure will be augmented in this counteracting effect by the tension of the springs 131 and 143 acting upon the bell-crank levers 127 and 139, respectively, upon the lever arm 121. Thus as the tension of the springs 131 and 143 is increased the differential between the presures exerted by the dynamic and static pressures must necessarily be increased to balance the same. It will further be seen that if such differential pressure is greater than the adjusted tension of spring 143 and is further less than the adjusted tension of spring 131, the force exerted upon the arm 121 will move the contact 150 into engagement with the contact 151 while the tension of spring 131 will pivot the arm 121 at the opposite end so that contact 155 will engage contact 156. In this position, the control circuit will obviously be closed. Upon the speed of the plane increasing, however, to a point where such differential pressure exerts a force greater than the tension of spring 131, the lever 121 will be pivoted upward with the contacts 151 and 150 as the bearing point so as to overcome the tension of spring 131 and open the contacts at the points 155 and 156. Moreover, should the speed of the plane decrease to such a point where the differential pressure will exert a force less than that for which spring 143 is adjusted, the lever arm 121 will move downwardly with the contacts 155 and 156 as the bearing point and cause a break in the control circuit at the contacts 150 and 151, the downward clockwise movement of the lever arm 121 being limited by the stop 160, as previously described.

I have further provided in my control switch a novel means for preventing the accidental opening or closing of the switch mechanism due to the effect of gravity thereon and the resulting inertia of the switch mechanism mass upon acceleration or deceleration, or change in the direction of flight of the plane as upon a sudden ascent or descent thereof. I have accordingly provided means for counter-balancing the forces exerted through the inertia of the switch mechanism mass in response to the aforesaid causes.

Thus vertically projecting from the knife edge bearing plate 118 is an arm 171 from which projects laterally a plate 172. The plate 172 supports one end of a compression spring 173 which is engaged at the opposite end by the switch lever 121. The spring 173 serves to prevent the accidental displacement of the switch arm 121 from the knife edge bearing 119. Affixed to the upper surface of the plate 172 and centrally located thereon is the vertically projecting bifurcated arm 174. Pivotally connected between the bifurcations of the arm 174 by a pin 175, is an arm 176. Arm 176 has mounted at the free end thereof a weighted portion 177. Pivotally connected intermediate the weighted portion 177 and the pivotal connection 175 is a post 178 connected to the arm 176 by a pin 180. The post 178 has mounted at the lower end a base 179 which is affixed to the supporting plate 108.

The weight of the weighted portion 177 is of sufficient value so as to balance the weight exerted on the opposite end of the arm 176 at the pin 175 by the switch mechanism parts. Thus if the acceleration of the plane is such that the inertia of the switch mechanism mass exerts a downward force upon the arm 176 at one end the inertia of the weighted portion 177 will exert a corresponding downward force at the other end of the arm 176 and thereby counter-balance the force exerted through the inertia of the switch mechanism mass. Likewise upon the inertia of the switch mechanism mass being such as to exert an upward force the same will correspondingly be counter-balanced by an upward force exerted through the inertia of the weighted member 177.

It will thus be seen that the switch mechanism will operate with extreme accuracy, unaffected by forces exerted through the inertia of the switch mechanism mass due to changes in the velocity of the plane. Further such counter-balancing mechanism will substantially prevent the actuation of the mechanism by the vibration of the plane.

There is further provided an electrical conducting strap 190 connected at one end to a terminal or bolt 191 which projects through the casing 101 and is screw-threadedly engaged at the outer side of the casing 101 by nuts 192. The opposite end of the strap 190 is fastened by the bolt 109 to the plate 108 whereby the strap may be electrically connected to the switch arm or lever 121 through the post 178, pin 180, arm 176, pin 175, arm 174, arm 171, knife edge bearing plate 118, knife edge bearing 119 and spring 173 contacting the lever or switch arm 121.

It will be seen from the diagram shown in Figure 7 that the latter switch mechanism is readily adapted for controlling suitable control circuits such as the flying hood control circuit and the indicator control circuit previously described and explained with reference to Figure 5. The numerals shown in the circuit diagram of Figure 7 and the parts indicated thereby correspond to those shown with reference to Figure 5.

Moreover it will be readily apparent that by adjusting the tension of spring 131 for the predetermined maximum air speed desired as indicated through the arm 161 and further adjusting the tension of spring 143 for the predetermined minimum air speed desired as indicated through the arm 162, the flying hood holding circuit controlled by the arm 121 will conveniently open upon such predetermined maximum and minimum aerodynamic air speed conditions. Further, such circuit will remain closed during air speed conditions between said predetermined minimum and maximum air speed conditions. Moreover the alarm or indicator light 407 will be energized only upon the deenergization of the relay magnet 83 which will occur only upon the opening of the switch contacts 155 and 156 by the switch arm 121 upon a predetermined maximum air speed condition. The energization of the relay magnet 83 being unaffected by the opening and closing of the switch contacts 150 and 151. Thus the pilot in control of the plane upon the automatic release of the flying hood will be immediately advised as to the cause thereof and the nature of the impending danger, whether due to the low or high speed of the plane.

A third modified form of my invention is illustrated in Figures 9, 10, 11, 12 and 13. As best shown in Figures 10 and 11 I have provided a casing indicated by numeral 201 to which is fastened by the screws 202, the insulation plate member 203 and the bottom plate member 204. The plate member 204 is provided with a connection 205 to which the static pressure line of a standard Pitot tube is connected. As shown in Figure 11 a channel 206 leads from the connection 205 into the interior of the casing 201 through a second channel 207 formed in the plate 203. A diaphragm 208 formed of suitable material is clamped between the plates 203 and 204 and is apertured at 209 to permit the passage of the static pressure through the channels 206 and 207 into the interior of the casing 201.

A second connection 210 is mounted on the plate 204 for connection of the dynamic pressure line of the Pitot tube.

The inner surface of the plate 204 has formed therein an annular recess 211 in which there is provided a smaller annular recess 212. The dynamic pressure connection 210 leads into the recess 212. The diaphragm 208 extends across the recess 211 and has mounted thereon a pair of concentric circular disks 213 and 214 positioned at opposite sides of the diaphragm 208 and suitably fastened thereto by rivets 215. Suitably fastened to the upper plate 214 at a central point therein is an actuating post 216. Oppositely disposed to the recess 211 is a second annular recess 217 of equal size formed in the plate 203. The diaphragm thus positioned between the plates 203 and 204 is adapted to fluctuate within the space formed by the recesses 211 and 217 in response to the dynamic pressure introduced through the connection 210. An annular opening 218 is further provided in the plate 203 and the said opening 218 leads from the recess 217 to the interior of the casing 201. Projecting through the opening 218 is the post 216 which is spaced apart from the side walls of the said opening. It will thus be seen that the static pressure entering through the connection 205 into the interior of the casing 201 through the channels 206 and 207 respectively will act upon the diaphragm 208 through the disk 214 so as to tend to counteract the force of the dynamic pressure acting upon the opposite disk 213. Thus any resulting movement of the post 216 will represent the difference between the static and dynamic pressures respectively.

Mounted on the insulation plate 203 within the casing 201 is a switch supporting bracket 219 fastened by the screws 220 secured in the plate 203 as shown in Figure 12. Projecting from the bracket plate 219 are the oppositely disposed bracket arms 221 and 222. Pivotally disposed between the arms 221 and 222 is a switch bracket 223. The switch bracket 223 has provided upwardly projecting arms 224 and 225. The arms 224 and 225 are pivotally connected to the respective arms 221 and 222 by the pins 226 and 227. Further projecting from the arms 224 and 225 are inwardly bent arms 228 and 229 which are suitably apertured to receive the opposite ends 230 and 231 of a hair pin shaped spring 232. As best shown in Figures 10, 11, and 12 there is slidably mounted on the switch plate 223 an adjustment plate 233. The adjustment plate 233 has formed therein a slot 234 in which is disposed an eccentric adjustment screw 235. Projecting from the plate 233 at one end and extending at a right angle thereto, is a supporting member 236, adjustably positioned intermediate the looped end of the hair pin shaped spring 232 and the attachment end of the said spring. By turning the eccentric screw 235 the position of the supporting member 236 with respect to the spring 232 may be varied as desired and the effective spring rate of the spring 232 thereby adjusted.

The adjustment plate 233 has provided at the opposite ends thereof the attachment screws 237 and 238 which, as best shown in Figure 10, are disposed in the slots 239 and 240 formed in the switch plate 223. Upon adjusting the plate 233 to the position desired through the eccentric screw 235 the plate may be fastened in such adjusted position by tightening the screws 237 and 238 in the respective slots 239 and 240.

The looped end of the hair pin shaped spring 232 rides upon the adjustable cam surface of an adjustment cam 241 whereby the tension of the hair pin shaped spring 232 may be conveniently adjusted. The cam 241 is fastened for the rotary adjustment on a shaft 242 which is channeled in the casing 201. The shaft 242 has fastened at the opposite end by a bolt 243 an adjustment knob 244. The knob 244 has formed thereon the radially projecting annular flange 245 in which are formed slots 246. Adjustably positioned in the slots 246 are attachment screws 247 which screw-threadedly engage a plate 248 which has formed thereon a pointer 249. For calibration purposes the screws 247 may be variably positioned within the slots 246 so as to adjustably position the pointer 249 with respect to the knob 244. The indicator pointer 249 is adapted to cooperate with suitable scale markings 250 provided on a scale plate 251 for purposes that will be explained hereinafter. It will be readily apparent that by adjusting the knob 244 the position of the surface of the cam 241 with respect to the hair pin shaped spring 232 may be varied and accordingly the tension exerted by the biasing spring 232 adjusted.

A contact point 252 is mounted on the under side of the switch plate 223 at the opposite side of the pivots 226 and 227 from the supporting member 236. The contact point 252 is adapted to cooperate with a further contact point 253 as will appear.

Further projecting from the switch arm 224 at the opposite side of the pivot 226 from the contact 252 is an actuating arm 254 having formed therein a slot 255 for receiving a link 256. This link 256 is operably connected to the post 216 as will be explained.

At the opposite side of post 216 diagonally positioned with respect to the switch bracket 219 is a second switch bracket 260 similarly constructed as the switch bracket 219 and attached to the plate 203 by bolts 261. The bracket 260 has upwardly extending bracket arms 262 and 263. A switch bracket 264 is pivotally disposed between the arms 262 and 263 and has provided upwardly projecting arms 265 and 266 which are pivotally connected by pins 267 and 268 respectively to the supporting bracket arms 262 and 263. Inwardly bent from the arms 265 and 266 are spring fastening arms 269 and 270 suitably apertured to receive the opposite outwardly bent ends 271 and 272 of a hair pin shaped spring 273. In order to vary the effective spring rate of the hair pin shaped spring 273 there is slidably mounted on the switch plate 264 an adjustment plate 274. The adjustment plate 274 has provided therein a slot 275 in which is suitably disposed an eccentric adjustment screw 276 whereby the adjustment plate 274 may be slidably positioned. Mounted on the adjustment plate 274 at an end opposite from that in which the free ends of the hair pin shaped spring 273 are secured to the switch plate is a supporting member 277 which projects upwardly at a right angle from the plate 274 and engages the hair pin shaped spring 273 intermediate the looped end and the attached ends thereof. It will thus be seen that by adjusting the position of the supporting member 277 with respect to the hair pin shaped spring 273 the effective spring rate of the hair pin shaped spring 273 may be readily adjusted.

Screw-threadedly engaged in the adjustment plate 274 are fastening screws 278 and 279 which are slidably disposed in slots 281 and 282 formed in the switch plate 264. Upon adjustment of the plate 274 the plate may be readily secured in such adjusted position by tightening the fastening screws 278 and 279. A contact 283 is mounted at the underside of the switch plate 264 at the same side of the pivots 267 and 268 as the supporting member 277.

The looped end of the hair pin shaped spring 273, as indicated in Figure 11, is adapted to ride along a cam surface provided on the adjustable cam 285. Cam 285 is fastened to an adjustment knob 287 similarly constructed to knob 244 previously described. The cam 285 may be rotated by means of the knob 287 so as to adjustably position the hair pin spring 273 for the adjustment of the tension thereof. The knob 287 has provided an indicator pointer 288 for cooperation with suitable scale markings 311.

Projecting from the switch arm 266 is an actuating arm 289 having formed therein a slot 290 in which is held a link 291.

Formed in the opposite end of the post 216 from the diaphragm 208 is a depression 292 adapted to receive a knife-edged pivot or bearing screw 294. The knife-edge bearing screw 294 is screw-threadedly engaged in an arm 295 at a point intermediate the opposite ends thereof. The arm 295 has positioned at the opposite ends thereof the downwardly projecting arms 296, and 297 which have provided slots 298, and 299 for receiving the links 291 and 256, previously mentioned. Links 291 and 256 are positioned in respective slots 298 and 299 at opposite sides of the pivot formed by the knife-edge 294 in the slot 292. Thus the arm 295 will readily balance the knife-edge screw 294, as indicated. The contact 283 mounted on the underside of the switch blade 264, as previously noted, is adapted to cooperate with a second contact 293 which is mounted on the strap 300 fastened to the plate 203 by the bolts 301. An electrical conductor 302 is in turn connected at one end to the strap 300 and at the opposite end to the conductor 80 leading to one terminal of a suitable source of electrical energy indicated by the numeral 81.

The contact 253, previously noted, is mounted on a strap 303 fastened to the plate 203 by the bolts 286. The strap 303 is in turn connected by a conductor 304 to conductor 85 which is connected to one terminal of a suitable indicating device or flying hood control circuit 86 such as illustrated in Figure 14 and previously noted. The opposite terminal of the control circuit 86 is connected through a ground conductor 87 to a grounded conductor 99 leading from the opposite terminal of the source of electrical energy 81. A conductor 305 electrically connects the bracket 219 and the bracket 260 so that an electrical connection between the brackets 219 and 260 and the switch brackets 223 and 264 is assured. An electrical connection 306, Figures 10 and 12, interconnects oppositely projecting parts of the arms 221 and 225, respectively, while an electrical connection 307, Figure 10, suitably interconnects upwardly projecting parts of the arms 265 and 263, respectively.

It will thus be seen that upon the contacts 252 and 253 being in engaging position and the contacts 283 and 293 being in engaging position, a closed circuit will result. Upon either of these contacts being broken the circuits will in turn be opened. This circuit as indicated in Figure 11 is similar to the control circuit previously described with reference to Figures 5 and 7, and controls the operation of an electromagnetic release latch which upon the circuit being opened causes a release of a hood indicated generally by the numeral 308 which may be operated in a manner described in the application of Willis H. Gille, Serial No. 460,522, filed October 2, 1942. Of course in place of the hood release latch this circuit may obviously control any other suitable indicating or control device.

In operation, it will be seen that when the differential pressure exerted upon the post 216 or the airspeed of the plane exceeds a predetermined point, post 216 will move upward causing a clockwise pivotal movement of the lever 295 which will in turn pivot through the link 291 the switch arm 264 in a counter-clockwise direction breaking the contact between the contact points 283 and 293. Thus upon a predetermined high airspeed the circuit controlling the hood release latch will be opened, thus causing the release of the hood upon a predetermined high airspeed.

Further, upon the differential pressure exerted upon the post 216 decreasing below a predetermined point or the airspeed of the plane decreasing below a predetermined airspeed, the post 216 will tend to move downwardly causing a downward pivotal movement of the arm 295 in a clockwise direction. This movement of the lever 295 will be transmitted through the link 256 to the switch arm 223 causing counter-clockwise movement of the switch lever 223 which will in turn cause the opening of the circuit between the contacts 252 and 253. Thus the circuit controlling the hood release latch will be opened upon a predetermined low differential pressure or low airspeed of the plane.

The airspeed at which the respective switches will open the circuit will of course depend upon the tension exerted upon the switch arm 264 by the spring 273 and the tension exerted upon the switch arm 223 by the spring 232. This tension may be conveniently adjusted through the respective adjustment knobs 287 and 244, as previously explained. The respective scale markings 311 and 250 are adapted for cooperation with the adjustment knobs and are calibrated so that the adjustment knobs may be adjusted for the airspeed desired.

In order that the airspeed condition causing the opening of the hood may be readily determined, I have provided novel indicating means operating upon the circuit opening the contacts 283 and 293 under high airspeed conditions. Connected to the connector 305 is a second electrical conductor 310 which leads to a conductor 82 for controlling a relay switch magnet 83 such as shown in Figure 11. The electromagnet 83 is connected through a grounded conductor 84 to the opposite terminal of the source of electrical energy indicated by numerals 81. Upon the circuit of the electromagnet 83 being closed, switch arm 400 is actuated by the energized magnet 83 so as to open an indicator control circuit through contacts 401 and 402. Upon the circuit of electromagnet 83 being opened, by the opening of the contacts 293 and 283, the spring arm 400 is biased so as to cause engagement of contacts 401 and 402. The arm 400 is connected through a conductor 405 to a suitable source of electrical energy 404. The opposite terminal of this source of electrical energy 404 is connected through a conductor 408 to an indicating device such as a light 407 which has the opposite terminal thereof connected to a conductor 406 which is in turn connected at the opposite end to the contact 402. Upon the closing of the contacts 401 and 402, a flow of electrical energy will result from the source 404 through the conductor 405, arm 400, contacts 401 and 402, connector 406 to the indicating lamp 407 and returning to the source of electrical energy 404 through the conductor 408. It will thus be seen that upon the hood being released and the indicating lamp being energized, the operator will immediately know that the cause of such opening of the hood was due to an excessive speed of the plane. While if the hood should release and the indicating lamp not be energized, the operator will accordingly know that the release of the hood was due to the fact that the plane was flying at an excessively low speed. Thus the air pilot will be enabled to immediately correct such conditions without delay and thereby avoid possible disastrous results.

In order to prevent the foregoing switch mechanism from being actuated by the inertia thereof or by the vibration of the plane during flight of the plane, I have provided means to counterbalance such effect. Such means includes a counter-balancing lever 350 pivotally connected intermediate the opposite ends thereof by a pin 351 to a fixed post 352. Post 352 is fastened by a bolt 353 to plate 203, as best shown in Figure 13. The switch actuating post 216 has provided therein a recess 354 in which is positioned one end of the counter-balancing lever 350. Such end of the counter-balancing lever 350 has provided therein a slot 355 for engaging a pin 356 mounted in the recess 354. At the opposite end of the counter-balancing lever 350 is a weighted member 357 counter-balancing the switch mechanism and exerting a force upon the switch actuating post 216.

It will thus be seen that upon the switch mechanism through the inertia thereof tending to move the post 216 in one direction, the corresponding inertia of the weight 357 will tend to exert through the counter-balancing lever 350 a force acting in the opposite direction upon the post 216. Thus the inertia of the one will counter-balance the inertia of the other and prevent opening of the switch contacts due to switch mechanism inertia caused by the rapid speed of operation of the aircraft.

I claim as my invention:

1. An instrument for use in an aircraft comprising, in combination, an acceleration responsive device and a control mechanism; said control mechanism including an actuating member, an aerodynamic condition responsive device operatively engaging said member at an intermediate point, first and second spring means connected to said member at opposite sides of said point for resisting movement of said member by said aerodynamic condition responsive device, and control devices actuated respectively by opposite ends of said member; said acceleration responsive device being connected to said control mechanism in counter-balanced relation thereto.

2. An aircraft instrument, comprising, in combination, an elongated actuating member, a pair of circuit controlling means actuated selectively by the ends of said member, airspeed responsive means operatively engaging said member, biasing means associated with each end of said member for exerting different effects thereon whereby said circuit controlling means are actuated at different values of airspeed conditions, one of said controlling means actuated by the actuating member when the air-speed responsive means moves the actuating member in one direction at a maximum air-speed value, the other of said controlling means actuated by the actuating member when the air-speed responsive means moves the actuating member in a second direction at a minimum air-speed value and means for adjusting at least one of said biasing means to vary the condition value at which the corresponding circuit controlling means is actuated.

3. An instrument for use in an aircraft comprising, in combination, an actuating member, first and second means biasing opposite ends of said member in one direction, third means for moving said member in another direction, control devices actuated respectively by opposite ends of said member upon movement of said third means, and fourth biasing means being connected to said member in counter-balanced relation thereto for stabilizing said member against movement by inertia forces.

4. An aircraft instrument for measuring predetermined minimum and maximum differentials of static and dynamic air pressures, comprising, in combination, means responsive to the differential of static and dynamic air pressures, a lever, a member operated by said means engaging said lever at a point intermediate its ends, a first means exerting a force on said lever on one side of said point for measuring said predetermined minimum differential of static and dynamic air pressures, a second means exerting a force on said lever on the other side of said point for measuring said predetermined maximum differential of the static and dynamic air pressures, and control means operated by said lever upon the occurrence of said minimum and maximum differentials of the static and dynamic air pressures.

5. An aircraft instrument for measuring predetermined minimum and maximum differentials of static and dynamic air pressures, comprising, in combination, means responsive to the differential of static and dynamic air pressures, a lever, a member operated by said means engaging said lever at a point intermediate its ends, a first means exerting a force on said lever on one side of said point for measuring said predetermined minimum differential of the static and dynamic air pressures, a second means exerting a force on said lever on the other side of said point for measuring said predetermined maximum differential of the static and dynamic air pressures, control means operated by said lever upon the occurrence of said minimum and maximum differentials of the static and dynamic air pressures, and visual indicating means indicating the amount of the forces exerted on the lever by the first and second means, whereby the value of the minimum and maximum differentials of the static and dynamic air pressures measured by the said first and second means may be determined.

6. An aircraft instrument comprising in combination, a casing, a diaphragm movably mounted within said casing, static and dynamic atmospheric pressure connections leading into said casing for differentially actuating the diaphragm, a post mounted on said diaphragm and movable therewith, an elongated actuating arm operably engaged by said post at a point intermediate the opposite ends of said arm and said post biasing the arm in one direction, a pair of pivoted bell-crank levers, each of said bell-crank levers linked at an end to opposite ends of said actuating arm, a pair of springs connected to other ends of said bell-crank levers in such a manner as to exert biasing forces upon said actuating arm opposite in direction to that in which the actuating arm is biased by the actuating post aforesaid, a first pair of electrical switch contacts positioned at one end of the actuating arm and at one side thereof, a second pair of electrical switch contacts positioned at the other end of said actuating arm and at the opposite side thereof, whereby upon the differential pressure exceeding the tension of one of said springs the first pair of switch contacts will be actuated to an open position and upon the differential pressure decreasing below the tension of the other of said springs the second pair of switch contacts will be actuated to an open position.

7. An aircraft instrument comprising in combination, a casing, a diaphragm movably mounted within said casing, static and dynamic atmospheric pressure connections leading into said casing for differentially actuating the diaphragm, a post mounted on said diaphragm and movable therewith, an elongated actuating arm operably engaged by said post at a point intermediate the opposite ends of said arm and said post biasing the arm in one direction, a pair of pivoted bell-crank levers, each of said bell-crank levers linked at an end to opposite ends of said actuating arm, a pair of springs connected to other ends of said bell-crank levers in such a manner as to exert biasing forces upon said actuating arm opposite in direction to that in which the actuating arm is biased by the actuating post aforesaid, a first pair of electrical switch contacts positioned at one end of the actuating arm and at one side thereof, a second pair of electrical switch contacts positioned at the other end of said actuating arm and at the opposite side thereof, whereby upon the differential pressure exceeding the tension of one of said springs the first pair of switch contacts will be actuated to an open position and upon the differential pressure decreasing below the tension of the other of said springs the second pair of switch contacts will be actuated to an open position, and manually operable means for adjusting the tension of said springs, including visual means for indicating the extent of such adjustment of said springs.

8. An aircraft instrument comprising in combination, a casing, a pair of pressure responsive bellows movably mounted within said casing, static and dynamic atmospheric pressure connections leading into said casing for differentially actuating said bellows, a pair of resilient switch blades, a first contact positioned at an end of one of said blades and at one side thereof, and a second switch contact positioned at an end of the other blade and at the opposite side thereof, each of said switch blades for engaging one of said contacts, and each of said switch blades operably engaged by one of said bellows, one of said bellows arranged for actuation of one of said switch blades at a predetermined maximum differential pressure and the other of said bellows arranged for actuation of the other of said switch blades at a predetermined minimum differential pressure, whereby said switch blades are actuated respectively upon predetermined maximum and minimum differential pressures so as to disengage said contacts.

9. An aircraft instrument comprising, in combination an actuating arm, means responsive to the differentials of static and dynamic air pressures operably engaging said arm at an intermediate point, first means limiting movement of said arm in one direction at one end of said arm, second means limiting movement of said arm in the opposite direction at the other end of said arm, and said arm so arranged as to pivot about said first and second limiting means, first control means actuated upon pivotal movement of said arm about said first limiting means in response to movement of said responsive means in one direction responsive to a predetermined maximum differential of the static and dynamic air pressures, and second control means actuated upon pivotal movement of said arm about said second limiting means in response to movement of said responsive means in an opposite direction at a predetermined minimum differential of the static and dynamic air pressures.

10. An aircraft instrument, comprising, in combination, a first control means, a second control means, and means responsive to the differentials of the static and dynamic air pressures, the first of said control means being actuated upon a predetermined maximum differential of the static and dynamic air pressures, the second of said control means being actuated upon a predetermined minimum differential of the static and dynamic air pressures, first and second biasing means exerting forces upon said responsive means for measuring the differentials of the static and dynamic air pressures at which said responsive means will actuate said first and second control means, and adjustment means for varying the force applied by said biasing means whereby said maximum and minimum differentials of static and dynamic air pressures may be adjusted.

11. An aircraft instrument, comprising, in combination, a first control means, a second control means, a responsive means actuated by the differential of the static and dynamic air pressures for actuating the first of said control means upon a predetermined maximum differential of the static and dynamic air pressures and for actuating the second of said control means upon a predetermined minimum differential of the static and dynamic air pressures, means for adjusting the movement in response to differentials of the static and dynamic air pressures of said responsive means, whereby said maximum and minimum differentials of the static and dynamic air pressures may be adjusted.

12. A device of the character described, comprising, in combination, a casing, a pair of actuating bellows movably mounted within said casing, static and dynamic atmospheric pressure conduits, the static pressure conduit leading into the interior of said actuating bellows and the dynamic pressure conduit leading into the interior of the casing in such a manner as to exert a pressure upon the exterior of said actuating bellows so that the static and dynamic pressure effect differentially said actuating bellows, each of said actuating bellows including an adjustment bellows mounted within said actuating bellows, a spring mounted within said actuating bellows and said spring fastened at one end by said adjustment bellows and said spring engaging at the opposite end the inner surface of the free end of said actuating bellows, a screw-threaded shaft and a nut mounted within said adjustment bellows, said nut screw-threadedly engaged on said shaft and said nut affixed at one end to said adjustment bellows for expanding and contracting the adjustment belows upon adjustment of the shaft in such a manner as to regulate the tension exerted by said spring upon said actuating bellows; a first control means actuated by one of said actuating bellows upon a predetermined decrease in said differential pressure, a second control means actuated by the other of said actuating bellows upon a predetermined increase in said differential pressure, adjustment knobs mounted on each of said screw-threaded shafts, and indicator markings for cooperation with said knobs for indicating the airspeed at which said first and second control means will be actuated respectively.

13. The combination comprising a first bellows, a second bellows mounted within said first bellows, and spring means operatively engaging said first bellows and said second bellows, a block slidably mounted within said second bellows and affixed at one end of said second bellows, a shaft mounted within said second bellows and screw-threadedly engaging said block whereby said second bellows may be expanded and contracted for adjustment of said spring means, an adjustment knob mounted on said shaft exteriorly of said second bellows, and indicator means for indicating the adjustment of said spring means.

14. An airspeed responsive device for actuating a switch, comprising, in combination a first switch actuating bellows, a casing enclosing said first bellows, a first conduit for conducting static atmospheric pressure into the interior of said first bellows, a second conduit for conducting dynamic atmospheric pressure into the interior of said casing so as to act upon the exterior of said first bellows, a second bellows mounted within said first bellows, a compression spring secured at one end by said second bellows and operatively engaging at the opposite end said first bellows, a block affixed within said second bellows and attached at the free end of said second bellows, said second bellows affixed at the upper end to said casing, a shaft projecting through said casing into said second bellows and screw-threadedly engaging said block, whereby said bellows may be expanded and contracted for adjustment of said compression spring, an adjustment knob mounted on said shaft exteriorly of said casing, and indicator means cooperating with said knob for indicating the airspeed at which said first bellows will actuate said switch.

15. An aircraft instrument, comprising, in combination, a first switch blade, a second switch blade, a first contact for engagement with said first switch blade, a second contact for engagement with said second switch blade, a first spring biasing said first switch blade into engagement with said first contact and a second spring biasing said second switch blade out of engagement with said second contact, control means actuatable in one direction for moving said first switch blade out of engagement with said first contact, and said control means actuatable in another direction for moving said second switch blade from engagement with said second contact, and means responsive to the differentials of static and dynamic air pressures for selectively actuating said control means in said directions.

16. An aircraft instrument, comprising, in combination, a first switch blade, a second switch blade, a first contact for engagement with said first switch blade, a second contact for engagement with said second switch blade, a first spring biasing said first switch blade into engagement with said first contact and a second spring biasing said second switch blade out of engagement with said second contact, control means actuatable in one direction for moving said first switch blade out of engagement with said first contact, and said control means actuatable in another direction for moving said second switch blade out of engagement with said second contact, airspeed responsive means for selectively actuating said control means in said directions and a slidably adjustable member engaging one of said springs for adjusting the spring rate of said one spring.

17. An aircraft instrument, comprising, in combination, a control member, an actuating member, means responsive to the differentials of static and dynamic air pressures operably connected to said actuating member, spring means for biasing said member for determining the values of the differentials of the static and dynamic air pressures at which said member may be actuated by said responsive means, first means for adjusting the spring rate of said spring means, and second means for adjusting the tension of said spring means.

18. In an aircraft instrument for measuring predetermined minimum and maximum differentials of static and dynamic air pressures, comprising, in combination, means responsive to the differential of the static and dynamic air pressures, means actuated by said responsive means, a first biasing means associated with said actuating means for measuring said predetermined minimum differential of the static and dynamic air pressures, a second biasing means associated with said actuating means for measuring said predetermined maximum differential of the static and dynamic air pressures, and control means actuated by said actuating means upon the occurrence of said minimum and maximum differentials of the static and dynamic air pressures.

19. In an aircraft instrument, comprising, in combination, a first switch blade, a second switch blade, a first contact for engagement with said first switch blade, a second contact for engagement with said second switch blade, a first spring biasing said first switch blade into engagement with said first contact and a second spring biasing the said second switch blade out of engagement with said second contact, an airspeed responsive diaphragm, a post mounted on said diaphragm, a lever, said post engaging said lever at a point intermediate the opposite ends of said lever, a first link connecting one end of said lever with said first switch blade, a second link connecting the other end of said lever with said second switch blade, the diaphragm actuating the lever in one direction through means of said post at a predetermined high airspeed so that the lever through means of the first link moves the first switch blade out of engagement with the first contact, and the diaphragm actuating the lever in a second direction through means of the post at a predetermined low airspeed so that the lever through means of the second link moves the second switch blade out of engagement with said second contact.

20. In an aircraft instrument, comprising, in combination, a first control means, a second control means, responsive means actuated by the differentials of static and dynamic air pressures, the first of said control means actuated upon a predetermined minimum differential of the static and dynamic air pressures, the second of said control means actuated upon a predetermined maximum differential of the static and dynamic air pressures, and means for adjusting the movement of said responsive means in response to the differentials of static and dynamic air pressures so that said minimum and maximum differentials of said static and dynamic air pressures may be adjusted.

21. In an aircraft instrument, comprising, in combination, a first switch blade, a second switch blade, a first contact for engagement with said first switch blade, a second contact for engagement with said second switch blade, a first spring biasing said first blade into engagement with said first contact and a second spring biasing said second switch blade out of engagement with said second contact, a control means actuable in one direction for moving said first switch blade out of engagement with said first contact, said control means actuable in another direction for moving said second switch blade out of engagement with said second contact, and an airspeed responsive means for selectively actuating said control means in said directions.

22. In an aircraft instrument, comprising, in combination, a first switch blade, a second switch blade, a first contact for engagement with said first switch blade, a second contact for engagement with said second switch blade, a first spring biasing said first blade into engagement with said first contact and a second spring biasing said second switch blade out of engagement with said second contact, a control means actuable in one direction for moving said first switch blade out of engagement with said first contact, said control means actuable in another direction for moving said second switch blade out of engagement with said second contact, an airspeed responsive means for selectively actuating said control means in said directions, and slidable adjustable means for engaging the first and second biasing springs for adjusting the spring rates of said springs.

23. In a control device, a pressure responsive diaphragm operatively engaging a first lever, a switch actuated by said first lever, a resilient lever hinged to said first lever at one end and abutting said first lever intermediate its length, and means for varying the position of the remote end of said resilient lever.

24. In a control device, a pressure responsive diaphragm operatively engaging a first lever, a switch actuated by said first lever, a resilient lever hinged to said first lever at one end and abutting said first lever intermediate its length, means for varying the position of the remote end of said resilient lever, and means for varying the point of abutment between said first lever and said resilient lever.

ALBERT E. BAAK.

REFERENCES CITED

The following references are of record in the file of this patent:

UNITED STATES PATENTS

| Number | Name | Date |
| --- | --- | --- |
| 1,186,307 | Grimes | Feb. 6, 1916 |
| 1,786,841 | Gilbert | Dec. 30, 1930 |
| 1,976,730 | Irwin | Oct. 16, 1934 |
| 2,116,960 | Brown et al. | May 10, 1938 |
| 2,165,037 | Ellis et al. | July 4, 1939 |
| 2,256,671 | Grooms | Sept. 23, 1941 |
| 2,266,144 | Baak | Dec. 16, 1941 |
| 2,275,866 | Runaldue | Mar. 10, 1943 |
| 2,280,494 | Kinsey et al. | Apr. 21, 1942 |
| 2,330,832 | Malone et al. | Oct. 5, 1943 |
| 2,335,943 | Jones | Dec. 7, 1943 |